United States Patent
Duvall et al.

[11] Patent Number: 5,962,809
[45] Date of Patent: Oct. 5, 1999

[54] APPARATUS AND METHOD FOR PROTECTING UNDERGROUND CABLES

[75] Inventors: John Farrell Duvall, Highlands Ranch; Bruce Allen Christiansen, Delores, both of Colo.

[73] Assignees: Williamette Valley Company, Eugene, Oreg.; Chempro, Inc., Delores, Colo.

[21] Appl. No.: 08/937,668

[22] Filed: Sep. 26, 1997

[51] Int. Cl.[6] .................................................. H02G 9/00
[52] U.S. Cl. ....................... 174/37; 174/68.1; 174/100; 52/220.5; 405/132
[58] Field of Search .................... 174/37, 28, 39, 174/68.1, 68.3, 101, 100; 405/132; 52/220.5

[56] References Cited

U.S. PATENT DOCUMENTS

| | | | |
|---|---|---|---|
| 2,007,969 | 7/1935 | Grodsky | 405/157 |
| 2,368,619 | 2/1945 | Soderberg | 248/65 |
| 3,164,668 | 1/1965 | Skubal | 174/45 R |
| 3,401,721 | 9/1968 | George | 138/92 |
| 3,473,339 | 10/1969 | Schlafly, Jr. | 405/157 |
| 3,582,533 | 6/1971 | Albright | 174/37 |
| 3,790,695 | 2/1974 | Floessel et al. | 174/28 |
| 3,973,366 | 8/1976 | Balane et al. | 52/99 |
| 5,063,473 | 11/1991 | Hau et al. | 361/93 |
| 5,236,178 | 8/1993 | Cole | 254/134.35 C |
| 5,359,143 | 10/1994 | Simon | 174/101 |

FOREIGN PATENT DOCUMENTS 657888  2/1963  Canada .................................. 174/68.3

*Primary Examiner*—Kristine Kincaid
*Assistant Examiner*—Dhiru R Patel
*Attorney, Agent, or Firm*—Marger Johnson & McCollom, P.C.

[57] ABSTRACT

The subject underground cable assembly protection system of this invention relates to a plurality of rigid substantially impact-resistant elongate protective channel members. Each of these channel members defines an enclosed compartment for housing the cable assembly. The system of the present invention also includes means for interconnecting adjoining channel members to each other. In this way, the underground cable assembly protection system can be formed. The channel member and/or the interconnecting means can comprise a polymeric material, and more preferably an impact-resistant polymeric material such as high-impact PVC or polyurethane. The channel member and/or the interconnecting means can comprise a substantially U-shaped cross-sectional configuration, more preferably the substantially U-shaped cross-sectional configuration of each the channel member comprises a horizonal base section having a pair of respective ends and a pair side sections attached to the pair of respective ends of the horizonal base section. The adjoining channel members of this invention typically form a joint therebetween and the interconnecting means, which is preferably a lap joint section, that overlaps the joint and in turn the adjoining channel members.

45 Claims, 1 Drawing Sheet

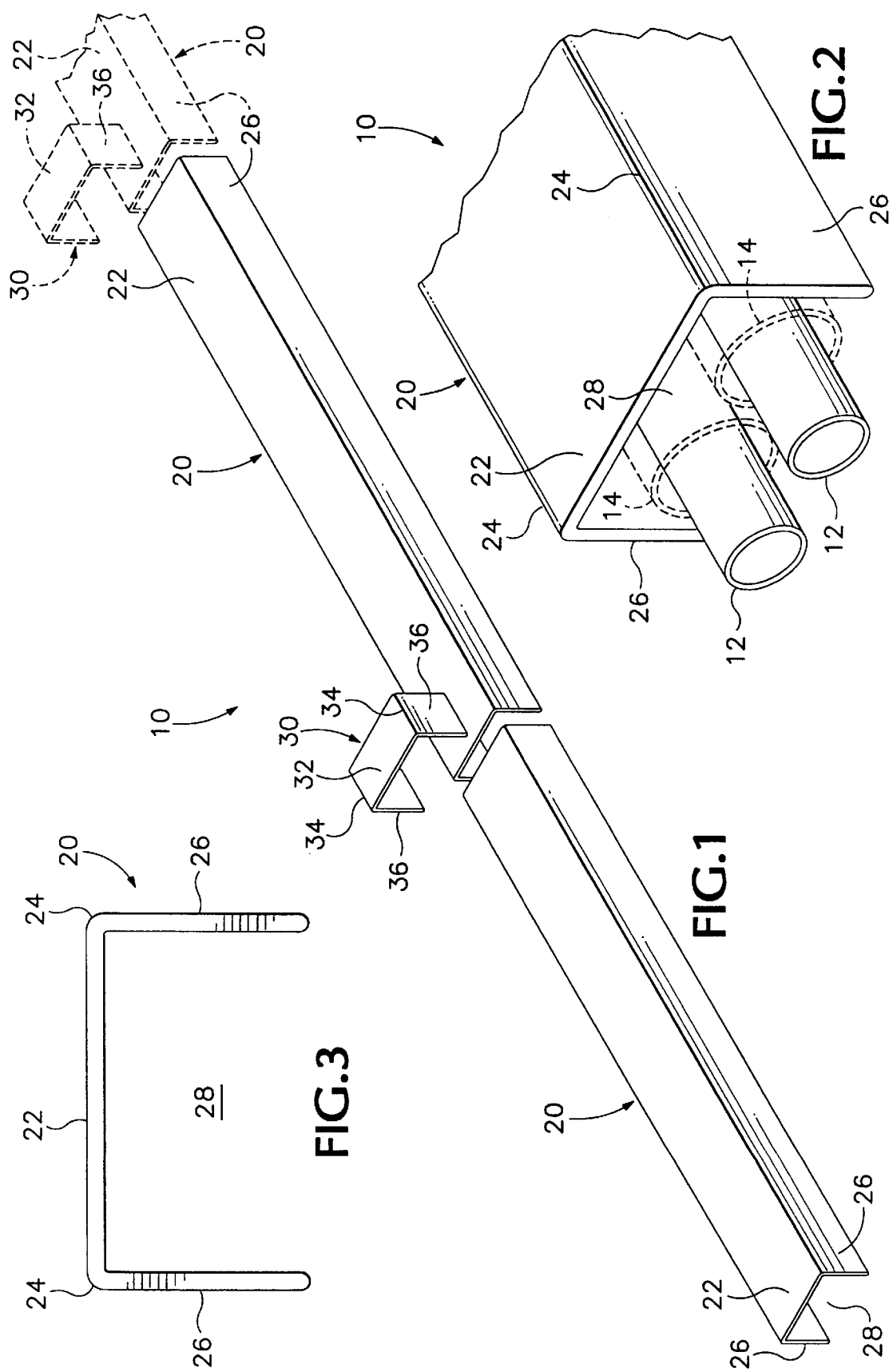

APPARATUS AND METHOD FOR PROTECTING UNDERGROUND CABLES

BACKGROUND OF THE INVENTION

This invention relates to an apparatus and method for protecting underground cable from being damaged, and more particularly, to an apparatus and method for safeguarding underground fiber optic or other types of buried cables from impact or other physical damage during use.

Fiber optic cable is composed of a bundle of long, thin fibers of glass, plastic or other transparent material closed with a protective sheath. Encoded light pulses carrying audio and video signals are sent through the fiber much like electric current travels along a wire. The advantage for fiber optic cable over conventional cable lies in its transmission characteristics. Because of the fiber's thinness and superior attenuation characteristics, a fiber optic cable can carry a much higher rate of information over many more channels than a comparably sized wire cable.

Fiber optic cable is more difficult to lay than conventional cable. It lacks the tensional strength of conventional wire cable and will fracture at a much lower pulling tension. Furthermore, because of its construction, fiber optic cable is relatively inflexible. The fibers are generally bundled in a spiral fashion around a stiff steel support wire within a hard plastic protective sheath. Bending of the cable beyond a limited range can break the fibers within.

Because of the time and effort and cost require to lay underground cable, it is important that it be protected from damage in areas where suitable shading or fill materials are not available. Also, once the cable is laid, damage problems often arise in the buried cable areas when contractors need to backfill or perform other excavation activities. The use of plastic sheathing is often insufficient to guard the integrity of the underground cable resulting in substantial costly and time-consuming maintenance problems.

Typically, the cable laying process involves trenching or excavating a pathway 24" to 42" deep, laying polyethylene conduit to encase the cable, backfilling the trench, and then pulling the cable through the conduit. Approximately 5–10% of the mileage excavated involves rocky terrain, and these sections must be trenched using pneumatic impact hammers or rock saws. The problem occurs have back filling of the trench begins and large rock fragments weighing up to 250 pounds roll down onto the conduit, cut through its wall, and damage the cable inside. The polyethylene conduit has low impact and cut resistance and will not adequately protect the cable.

To remedy this problem, contractors have employed various methods to protect the conduit and cable. These are:

1. Hauling rock free fill dirt from remote locations in large tractor-trailer trucks. This dirt is laid over the conduit/cable in sufficient depths to protect it form the rocks during backfilling. This process is costly due to the distance dirt has to be hauled and its availability, Another problem with this method is the accessibility of the trench to haul trucks in mountainous or rugged terrain.

2. Utilizing concrete-type mixtures such as "sackcrete" which is dumped over the conduit/cable in sufficient depth to protect them from damage. The concrete material is activated by the moisture within the soil forming a hard barrier. These materials typically come in 50–80 pound bags, which must be carried by workers and individually dumped into the trench. This process is slow, costly, and exposes the workers to potential lifting type injuries. This also creates problems if the buried cable must be excavated for repair at a later date due to the concrete barrier that has formed over the cable/conduit.

Therefore, a need exists for an effective and efficient apparatus and method for protecting underground cable assemblies, particularly optical cable assemblies, in areas where suitable shading or fill materials are not available, which can be employed when contractors need to backfill or perform other excavation activities, and which can safeguard the integrity of the underground cable thereby avoiding substantial costly and time-consuming maintenance problems.

SUMMARY OF THE INVENTION

The needs expressed above have been fulfilled by the underground cable protection system which has been produced according to the teachings of the present invention, and by the subject method of protecting underground cables.

The subject underground cable assembly protection system comprises a plurality of rigid substantially impact-resistant elongate protective channel members. Each of these channel members defines an enclosed compartment for housing the cable assembly. The system of the present invention also includes means for interconnecting adjoining channel members to each other. In this way, the underground cable assembly protection system can be formed.

Preferably, the channel member and/or the interconnecting means comprises a polymeric material, and more preferably an impact-resistant polymeric material. The preferred polymeric materials for use in this invention are impact-resistant PVC and polyurethane.

Preferably, the channel member and/or the interconnecting means comprises a substantially U-shaped cross-sectional configuration, more preferably the substantially U-shaped cross-sectional configuration of each the channel member comprises a horizonal base section having a pair of respective ends and a pair side sections attached to the pair of respective ends of the horizonal base section. Furthermore, the pair of side sections are typically attached at right angles to the pair of respective ends of the horizonal base section. In the most preferred cases, the base section has a length which is greater than the length of each of the pair of side sections.

The adjoining channel members of this invention typical form a joint therebetween and the interconnecting means, which is preferably a lap joint section, overlaps the joint and in turn the adjoining channel members. Although the subject system is designed to protect all types of underground cable assemblies including optical cable and any underground cable surrounded by a protective tubular sheathing, such as PVC conduit, which is not impact-resistant under substantially all use and installation conditions.

The channel member and/or the means for interconnecting adjoining channel members to each other of the present invention, which is typically formed of a polymeric material, preferably has a Hardness (Shore "D") of at least about 70, more preferably at least about 72, and most preferably at least about 75.

The channel member and/or the means for interconnecting adjoining channel members to each other also preferably have a Tear Strength (Die "C") of at least about 750 pli, more preferably at least about 800 pli, and most preferably at least about 850 pli.

The channel member and/or the means for interconnecting adjoining channel members to each other preferably have a Trouser Tear Strength of at least about 110 pli, more preferably at least about 120 pli, and most preferably at least about 140 pli.

The channel member and/or the means for interconnecting adjoining channel members to each other preferably have an Elongation (At Break) of at least about 60, more preferably at least about 65, and most preferably at least about 70%.

The channel member and/or the means for interconnecting adjoining channel members to each other preferably have a Tensile Strength of at least about 4,200 psi, more preferably at least about 4,400 psi, and most preferably at least about 4,600 psi.

As a further measure of impact strength of the channel member and/or the means for interconnecting adjoining channel members, Notched Izod strength tests were conducted employing the technique described in ASTM D256. Preferably, the channel member and/or the means for interconnecting adjoining channel members of the present invention have a Notched Izod impact strength of at least about 12, more preferably at least about 16, and most preferably at least about 18.

In use, a method for protecting at least one underground cable assembly which comprises certain important steps. First, a trench is formed for burying at least one underground cable assembly. Next, at least one underground cable assembly is inserted into each trench. A plurality of rigid substantially impact-resistant elongate protective channel members is then provided. Each of the channel member defines an enclosed compartment for housing the cable assembly. Then, the plurality of channel members are installed in the trench so that said cable assemblies are housed within the confines of said enclosure compartment. The channel members are positioned to adjoin each other forming a joint therebetween. A plurality of means for interconnecting the adjoining channel members are then provide. Then, the plurality of interconnecting means are installed said plurality of channel members over each of said joints thereby forming an underground cable assembly protection system.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 1 is a perspective, exploded view of an underground cable assembly protection system 10 of the present invention.

FIG. 2 is an enlarged, broken view of an impact-resistant elongate protective channel member 20 for housing a cable assembly 12.

FIG. 3 is an enlarged, end view of the impact-resistant elongate protective channel member 20 of FIG. 1.

DETAILED DESCRIPTION OF A PREFERRED EMBODIMENT

The product of the present invention can be used to protect buried fiber-optic and other types of underground cable from impact damage. The subject concept involves channel sections, typically 10 feet in length and having various internal dimensions, which can be installed over the conduit/cable assembly for impact protection. This enables the contractor to backfill with whatever the available materials might be.

The individual channel sections are joined end to end and a channel joint section, typically a 6" long channel section, is used to cover the joint between adjacent channel sections. The channel joint section keeps the joint adjacent the channel sections from being separated in the event a rock impacts the joint.

The cable laying proces may involve the installation of multiple cables, usually two or four cable configurations. This requires the utilization of channels with various interior dimensions. For example, the preferred channel sections are 5.0" wide×3.0 or 5.5" high (inside dimensions) with a ¼" wall thickness.

As depicted in FIGS. 1–3, a system 10 of the present invention is provided. System 10 is designed to protect underground cable assemblies, particularly optical cables 12 in conduit 14 (see FIG. 2), and the like, from being damaged during installation or in use.

Underground cable assembly protection system 10 comprises a plurality of rigid substantially impact-resistant elongate protective channel members 20. The channel members 20 each comprise an elongate base section 22 having a pair of respective elongate ends 24. A pair of elongate side sections 26 are attached to the pair of respective ends 24 of the horizonal base section 22. Each of the channel members 20 defines an enclosed compartment 28 for housing the cable assembly 12.

Adjoining channel members 20 are interconnectingly attached one to each other thereby forming the underground cable assembly protection system 10 (see FIG. 1). Each adjoining channel member 20 forms a joint 40 at the point of intersection thereof.

The preferred manner of interconnection of adjoining channel members 20 is through the use of lap joint sections 30. Lap joint sections 30 are designed in a configuration which is complementary with the configuration of the outer surface of the channel members 20. More specifically, the lap joint sections 30 each comprise an elongate base section 32 having a pair of respective elongate ends 34. A pair of elongate side sections 36 are attached to the pair of respective ends 34 of the horizontal base section 22. Each of the lap joint sections 30 defines an enclosed chamber 38 within which the adjoining channel members 20 fits. Each of the lap joint sections 30 cover the joints 40.

The channel sections and the channel joint sections are fabricated from materials, preferably polymeric materials, capable of resisting the above-described impact from rocks and the like. For most applications, impact-resistant thermoplastic or thermosetting polymers would be the materials of choice. It an extrusion process were employed in the formation of the channel sections and the channel joint sections, a thermoplastic material would be preferred. Impact-resistant polyurethane would be preferably employed to fabricate the channel sections and the channel joint sections of the present invention. Other materials which might be considered are ABS polymers and co-polymers, Polycarbonate polymers and co-polymers, and olefin polymers and co-polymers such as polypropylene co-polymers and linear low-density polyethylene.

The following ASTM test procedures were employed, using a test temperature of 24 degrees C. (75 degrees F.), in evaluating the channel sections and the channel joint sections of this invention:

| | |
|---|---|
| Hardness, Durometer A or D | ASTM D2240 |
| Tear strength, Die "C" | ASTM D624 |
| Tear Strength, Split | ASTM D470 |

-continued

| Tensile Strength | ASTM D412 |
| --- | --- |
| Torsional Modulus, Clash-Berg | ASTM D1043 |
| Young's Modulus | ASTM D797 |
| Compression set, Method B | ASTM 395 |
| Brittleness Temperature, Solenoid | ASTM D746 |
| Abrasion resistance, NBS | ASTM D1630 |
| Elongation at break | ASTM D412 |
| Dielectric Constant | ASTM D150 |
| Dielectric Strength | ASTM D149 |
| Impact Strength, Notched Izod | ASTM D256 |

Also, a drop test procedure has been developed to determine the survivability of the channel sections under impact conditions. A benchmark standard of 200 pound weight from a distance of two feet was employed utilizing a steel angle member depicted in FIG. 1 as the impact tool. This steel angle impacts the channel section across the width of its top surface 2. The channel may deflect under this impact, but it should not allow penetration of the steel angle into the channel cavity. The dimension of the steel angle is 1½"× 1½"×12".

The drop-tester was comprised of two vertical steel channels welded to a 0.500" steel plate at the base. These uprights are approximately 24" apart and are joined at the top with a steel channel. The uprights are 72" high and have 1" diameter rods located on the inside of each vertical channel to accommodate the horizontal sliding impact bar. This sliding impact bar, which incorporates the impact tool on the bottom side, has provisions on top of the bar for steel weight plates in order to change the weight of the impact bar. The center impact bar has a quick release device associated therewith which comprises a pin and lever assembly which releases the weight from a ring attached to the end of a ⅛" diameter aircraft cable. This cable extends vertically from the center bar over a first pulley attached to the top center channel. The cable then moves over a second pulley, which is attached to the top of the left vertical upright. The cable extends downwardly to a hand-driven winch attached to the left vertical upright. This winch is used to raise the center impact weight to the proper height for testing.

The center weight can be dropped on the sample from various heights via the quick release mechanism on the center impact bar. After testing, the center impact bar is reattached to the ring on the end of the aircraft cable, raised vertically via the hand-driven winch. The horizontal beam was raised to various heights and dropped on actual product profiles.

Drop tests were conducted on product samples with inside dimensions of 3"×5" and 5.5"×5", each having 0.250" wall thickness. The total crossbeam weight in the tests was 200 pounds and this was dropped from heights of two, three, and fourth feet about the product samples. This resulted in forces of 400, 600, and 800 foot-pounds respectfully. A benchmark of 400 foot-pounds was established as a pass/fail criteria for the samples.

The pass/fail criteria for testing the "impact-resistance" of a given product sample included the following parameters:
1. There must be no penetration of the angle tool into the interior channel cavity.
2. Maximum cut penetration of the exterior surface must not exceed 0.125".
3. Maximum deflection of the structure upon 400 foot-pounds of impact must not exceed 0.375".
4. The side walls of the profile must not exhibit splits, cracks, or other visible damage at 400 foot-pounds of impact.

The tests were conducted at near ambient temperatures (75–80 degrees F.). In the first instance, CE-75D Polyurethane samples each having a dimension of 3"×5"×¼×18" were employed. Impact forces of 400, 600, and 800 foot-pounds, respectively, were imparted to the samples. The results were as follows:
  400 ft.-lbs. No penetration into channel cavity or resultant cracks in side walls. Indentations in the top surface did not exceed 1/32".
  600 ft.-lbs. No penetration into channel cavity or resultant cracks in side walls. Indentations in the top surface did not exceed 1/16".
  800 ft.-lbs. No penetration into channel cavity or resultant cracks in side walls. Indentations in the to surface did not exceed 1/16".

The above-described tests were repeated using CE-75C Polyurethane, a sample size of 5"×5.5"×¼×18", and impact forces of 400, 600, and 800 foot pounds, respectively. The results were as follows:
  400 ft.-lbs. No penetration into channel cavity or resultant cracks in side walls. Indentations in the top surface did not exceed 1/32".
  600 ft.-lbs. No penetration into channel cavity or resultant cracks in side walls. Indentations in the top surface did not exceed 1/16".
  800 ft.-lbs. No penetration into channel cavity or resultant cracks in side walls. Indentations in the to surface did not exceed 1/16".

The above-described tests were repeated using High-Impact PVC (Polyvinylchloride), sample sizes of 3"×5.5"× ¼×18", and 5"×5.5"×¼×18", respectively, and impact forces of 400, 600, and 800 foot pounds, respectively. The results were as follows:
  400 ft.-lbs. No penetration into channel cavity or resultant cracks in side walls. Indentations in the top surface did not exceed 1/16".
  600 ft.-lbs. No penetration into channel cavity or resultant cracks in side walls. Indentations in the top surface did not exceed ⅛".
  800 ft.-lbs. No penetration into channel cavity or resultant cracks in side walls. Indentations in the to surface did not exceed ⅛".

Having illustrated and described the principles of my invention in a preferred embodiment thereof, it should be readily apparent to those skilled in the art that the invention can be modified in arrangement and detail without departing from such principals. I claim all modifications coming within the spirit and scope of the accompanying claims.

We claim:

1. An underground cable assembly protection system, comprising
  a plurality of rigid substantially impact-resistant elongate protective channel members, having a Hardness (Shore "D") of at least about 70, each of said channel members defining an enclosed compartment for housing said underground cable assembly; and
  means for interconnecting adjoining channel members to each other thereby forming said underground cable assembly protection system.

2. The system of claim 1 wherein each of said channel members comprises a polymeric material.

3. The system of claim 2 wherein said polymeric material comprises a polyurethane.

4. The system of claim 1 wherein each of said interconnecting means comprises a polymeric material.

5. The system of claim 4 wherein said polymeric material comprises a polyurethane.

6. The system of claim 1 wherein each of said channel members comprises a substantially U-shaped cross-sectional configuration.

7. The system of claim 6 wherein said substantially U-shaped cross-sectional configuration of each said of channel members comprises a horizonal base section having a pair of respective ends and a pair of side sections attached to the pair of respective ends of said horizonal base section.

8. The system of claim 7 wherein said horizontal base section has a length which is greater than the length of each of said pair of side sections.

9. The system of claim 7 wherein said pair of side sections are attached at right angles to the pair of respective ends of said horizonal base section.

10. The system of claim 1 wherein each of said interconnecting means comprises a substantially U-shaped cross-sectional configuration.

11. The system of claim 10 wherein said substantially U-shaped cross-sectional configuration of each said interconnecting means comprises a horizonal base section having a pair of respective ends and a pair side sections attached to the pair of respective ends of said horizonal base section.

12. The system of claim 11 wherein said base section has a length which is greater than the length of each of said pair of side sections.

13. The system of claim 11 wherein said pair of side sections are attached at right angles to the pair of respective ends of said horizonal base section.

14. The system of claim 1 wherein each of said adjoining channel members form a joint therebetween and said interconnecting means overlap said joint.

15. The system of claim 1 wherein said underground cable assembly comprises at least one underground cable or at least one underground cable surrounded by a protective tubular sheathing which is not impact-resistant.

16. The system of claim 1 wherein said underground cable assembly comprises an optical cable.

17. The system of claim 1 wherein each of said interconnecting means comprises an impact-resistant polymeric material.

18. The system of claim 1 wherein the channel members have a Tensile Strength of at least about 4,200 psi.

19. A method for protecting at least one underground cable assembly employing an underground cable assembly protection system which comprises:
    forming a trench for said at least one underground cable assembly;
    installing said at least one underground cable assembly in said trench;
    providing a plurality of rigid substantially impact-resistant elongate protective channel members, having a Hardness (Shore "D") of at least about 70, each of said channel members defining an enclosed compartment for housing said underground cable assembly;
    installing said plurality of channel members in said trench so that said underground cable assembly is housed within the confines of said enclosed compartment, said channel members adjoining each other and forming joints therebetween;
    providing a plurality of means for interconnecting said adjoining channel members; and
    interconnecting said plurality of channel members by installing said plurality of interconnecting means over each of said joints thereby forming said underground cable assembly protection system.

20. The method of claim 19 wherein each of said channel members comprises a polymeric material.

21. The method of claim 19 wherein said polymeric material comprises a polyurethane.

22. The method of claim 19 wherein each of said interconnecting means comprises a polymeric material.

23. The method of claim 22 wherein said polymeric material comprises a polyurethane.

24. The method of claim 19 wherein each of said channel members comprises a substantially U-shaped cross-sectional configuration.

25. The method of claim 19 wherein each of said interconnecting means comprises a substantially U-shaped cross-sectional configuration.

26. The method of claim 25 wherein said substantially U-shaped cross-sectional configuration of each of said channel members comprises a horizonal base section having a pair of respective ends and a pair side of sections attached to the pair of respective ends of said horizonal base section.

27. The method of claim 26 wherein said substantially U-shaped cross-sectional configuration of each of said interconnecting means comprises a horizonal base section having a pair of respective ends and a pair side sections attached to the pair of respective ends of said horizonal base section.

28. The method of claim 27 wherein said pair of side sections are attached at right angles to the pair of respective ends of said horizonal base section.

29. The method of claim 27 wherein said base section has a length which is greater than the length of each of said pair of side sections.

30. The method of claim 29 wherein said base section has a length which is greater than the length of each of said pair of side sections.

31. The method of claim 29 wherein said pair of side sections are attached at right angles to the pair of respective ends of said horizontal base section.

32. The method of claim 19 wherein said cable assembly comprises at least one underground cable or at least one underground cable surrounded by a protective tubular sheathing which is not impact-resistant.

33. The method of claim 19 wherein said cable assembly comprises optical cable.

34. The method of claim 19 wherein the channel members have a Tear Strength (Die "C") of at least about 750 pli.

35. The method of claim 19 wherein the channel members have a Trouser Tear Strength of at least about 110 pli.

36. The method of claim 19 wherein each of said interconnecting means comprises an impact-resistant polymeric material.

37. The method of claim 19 wherein the channel members have an Elongation (At Break) of at least about 60.

38. The method of claim 19 wherein the channel members have a Tensile Strength of at least about 4,200 psi.

39. An underground cable assembly protection system, comprising
    a plurality of rigid substantially impact-resistant elongate protective channel members, each of said channel members defining an enclosed compartment for housing said underground cable assembly; and
    means for interconnecting adjoining channel members to each other thereby forming said underground cable assembly protection system wherein the members have a Tensile Strength of at least about 4,200 psi.

40. A method for protecting at least one underground cable assembly employing an underground cable assembly protection system which comprises:
    forming a trench for said at least one underground cable assembly;

installing said at least one underground cable assembly in said trench;

providing a plurality of rigid substantially impact-resistant elongate protective channel members having a Tear Strength (Die "C") of at least about 750 pli, each of said channel members defining an enclosed compartment for housing said underground cable assembly;

installing said plurality of channel members in said trench so that said underground cable assembly is housed within the confines of said enclosed compartment, said channel members adjoining each other and forming joints therebetween;

providing a plurality of means for interconnecting said adjoining channel members; and interconnecting said plurality of channel members by installing said plurality of interconnecting means over each of said joints thereby forming said underground cable assembly protection system.

41. A method for protecting at least one underground cable assembly employing an underground cable assembly protection system which comprises:

forming a trench for said at least one underground cable assembly;

installing said at least one underground cable assembly in said trench;

providing a plurality of rigid substantially impact-resistant elongate protective channel members having a Trouser Tear Strength of at least about 110 pli, each of said channel members defining an enclosed compartment for housing said underground cable assembly;

installing said plurality of channel members in said trench so that said underground cable assembly is housed within the confines of said enclosed compartment, said channel members adjoining each other and forming joints therebetween;

providing a plurality of means for interconnecting said adjoining channel members; and interconnecting said plurality of channel members by installing said plurality of interconnecting means over each of said joints thereby forming said underground cable assembly protection system.

42. A method for protecting at least one underground cable assembly employing an underground cable assembly protection system which comprises:

forming a trench for said at least one underground cable assembly;

installing said at least one underground cable assembly in said trench;

providing a plurality of rigid substantially impact-resistant elongate protective channel members having an Elongation (At Break) of at least about 60, each of said channel members defining an enclosed compartment for housing said underground cable assembly;

installing said plurality of channel members in said trench so that said underground cable assembly is housed within the confines of said enclosed compartment, said channel members adjoining each other and forming joints therebetween;

providing a plurality of means for interconnecting said adjoining channel members; and interconnecting said plurality of channel members by installing said plurality of interconnecting means over each of said joints thereby forming said underground cable assembly protection system.

43. An underground cable assembly protection system, comprising a plurality of rigid substantially impact-resistant elongate protective channel members, each of said channel members defining an enclosed compartment for housing said underground cable assembly; and means for interconnecting adjoining channel members to each other thereby forming said underground cable assembly protection system wherein the channel members have a Tear Strength (Die "C") of at least about 750 pli.

44. An underground cable assembly protection system, comprising a plurality of rigid substantially impact-resistant elongate protective channel members, each of said channel members defining an enclosed compartment for housing said underground cable assembly; and means for interconnecting adjoining channel members to each other thereby forming said underground cable assembly protection system wherein the channel members have a Trouser Tear Strength of at least about 110 pli.

45. An underground cable assembly protection system, comprising a plurality of rigid substantially impact-resistant elongate protective channel members, each of said channel members defining an enclosed compartment for housing said underground cable assembly; and means for interconnecting adjoining channel members to each other thereby forming said underground cable assembly protection system wherein the channel members have an Elongation (At Break) of at least about 60.

* * * * *